United States Patent [19]
Frank

[11] Patent Number: 4,974,596
[45] Date of Patent: * Dec. 4, 1990

[54] TRANSDUCER WITH CONDUCTIVE POLYMER BRIDGE

[75] Inventor: Thomas P. Frank, Dublin, Ohio
[73] Assignee: Medex, Inc., Hilliard, Ohio
[*] Notice: The portion of the term of this patent subsequent to Aug. 1, 2006 has been disclaimed.
[21] Appl. No.: 386,211
[22] Filed: Jul. 28, 1989

Related U.S. Application Data

[63] Continuation-in-part of Ser. No. 132,014, Dec. 14, 1987, Pat. No. 4,852,581.

[51] Int. Cl.$^5$ ............................................. A61B 5/02
[52] U.S. Cl. ................................... 128/672; 128/675; 338/4; 73/726
[58] Field of Search ............................... 128/672-673, 128/675, 748; 338/3-4, 36, 42; 73/725-727

[56] References Cited

U.S. PATENT DOCUMENTS

| | | | |
|---|---|---|---|
| 3,219,035 | 11/1965 | Pressman et al. | 128/672 |
| 3,341,794 | 9/1967 | Stedman | 338/4 |
| 4,023,562 | 5/1977 | Hynecek et al. | 128/675 X |
| 4,116,075 | 9/1978 | Ort | 338/4 X |
| 4,231,011 | 1/1980 | DelVecchio et al. | 73/726 X |
| 4,333,349 | 6/1982 | Mallon et al. | 338/4 X |
| 4,376,929 | 3/1983 | Myhre | 338/4 |
| 4,488,436 | 12/1984 | Mohri et al. | 338/42 X |
| 4,506,250 | 3/1985 | Kirby . | |
| 4,618,844 | 10/1986 | Takahashi et al. | 338/36 X |

OTHER PUBLICATIONS

Thick-Film Pressure Sensors: Performances and Practical Applications by R. Dell'Acqua, G. Dell'Orto and P. Vicini, European Hybrid Micro-Electronics Conference, Avignon, France, May 20, 21 and 22, 1981, pp. 121–134.
"A Flow-Through Transducer for Biomedical Applications", by Thomas P. Frank: Aug. '81 Iss. Proceedings IEEE Transactions on Biomedical Engineering: Colvern Literature on Automotive Sensors; Conductive Polymer Series CP 1600 & CP 1700; Conductive Plastic Series 11CP, 15CP, 18CP & 20CP; Conductive Polymer Strain Sensors Provisional Data Sheet: Conductive Plastic Pots.
A New Approach by H. V. Swindell, reprinted from New Electronics 3-22-83.
"New Sensing Role for Conductive Polymer", Auto Industry Newsletter Published by Industrial Newsletters, P.O. Box 96, St. Albans, Herts, AL 12AN, England, Approx. 1–2 years ago.
"Effects of Axial Stretching on the Resistivity of Carbon Black Filled Silicone Rubber", by J. Kost, M. Narkis and A. Foux, Polymer Engineering and Science, Jul. 1983, vol. 23, No. 10, pp. 567–571.
"Investigation of the Performance of Conducting Polymer Strain Gauge", by H. J. MacGillivray, M. R. Etemad & G. A. Webster, Mechanical Engineering Department Imperial College of Science and Technology, Dec., 1985, pp. 46–48 (private study: not published).
"Resistivity of a Composite Conducting Polymer as a Function of Temperature, etc.", by B. Lundberg and B. Sundqvist, J. Appl. Phys. 60(3), Aug. 1, 1986, pp. 1074–1079.
"Long Term Stability of Thick Film Resistors Under Strain", by R. Dell'Acqua, G. Dell'Orto, A. Simonetta, The International Journal for Hybrid Microelectronics, vol. 5, No. 2, Nov. 1982, pp. 82–85.
"Flat Diaphragm with Rigid Center", pp. 157–163, Flat and Corrugated Diaphragm Design Handbook, Mario DiGiovanni, Marcel Dekker, Inc., N.Y., 1982.

Primary Examiner—Max Hindenburg
Assistant Examiner—J. P. Lacyk
Attorney, Agent, or Firm—Wood, Herron & Evans

[57] ABSTRACT

A transducer has a thick perimeter and an integral diaphragm extending across said perimeter, all formed of a thermoplastic resin. A thick mass is molded at the center of the diaphragm. Resistive elements formed of a conductive polymer are printed and baked on the diaphragm to form a Wheatstone bridge. The transducer is used as an accelerometer or load cell.

6 Claims, 2 Drawing Sheets

TRANSDUCER WITH CONDUCTIVE POLYMER BRIDGE

This application is a continuation-in-part of Serial No. 07/132,014, filed Dec. 14, 1987, now U.S. Pat. No. 4,852,581.

Background of the Invention

This invention relates to a sensor which can be used as a fluid pressure transducer, a load cell or an accelerometer.

The blood pressure transducer of the type disclosed in copending application Serial No. 009,643, filed Jan. 27, 1987, employs a silicon sensor. The silicon sensor is very small, being a fraction of a square inch in area. It is circular in cross section and has a Wheatstone bridge strain gauge formed of piezo-resistive elements diffused into the silicon substrate. The silicon substrate is chemically etched away on the surface opposite the Wheatstone bridge so as to form a thin silicon diaphragm that flexes when subjected to pressure causing the resistors in the Wheatstone bridge strain gauge to be stressed to produce an indication of the applied pressure. The manufacturing process for the silicon sensor is necessarily expensive. Further, the sensor is temperature-sensitive and therefore requires a temperature compensation circuit.

Strain gauges have been formed in other ways. It is known to form a strain gauge by depositing a thick film resistor on alumina. The resistor must be baked at a high temperature of the order of 800° F. Hence, a ceramic such as alumina is required as the substrate.

It is also known to form strain gauges from conductive polymers, again using alumina as a substrate. These thick film resistor and conductive polymer strain gauges have all been massive compared to the tiny silicon sensor.

Summary of the Invention

An objective of the present invention has been to provide a less expensive sensor to replace the more expensive sensors of the type that have been described.

This objective of the invention is attained by molding a diaphragm from a high temperature thermoplastic. The diaphragm is molded in a cup shape having thick edges and a thin, flexible central portion onto which the strain gauge is to be formed.

A Wheatstone bridge of conductive polymers is screen-printed onto the surface of the thin central diaphragm of the molded element. The conductive polymers can be trimmed to a desired resistance value using a Nd-YAG laser or abrasive-type trimmers. The conductive polymers are baked onto the substrate at over 400° F. Metal conductors are printed on the surface of the substrate at the ends of the resistor elements. These metal conductors are connected by a conductive epoxy to lead wires by which the sensor is connected into its monitoring circuit.

Among the advantages of the invention are that it is much less expensive than known sensors that require special metals or ceramics as substrates. The sensor of the present invention is substantially temperature-insensitive and hence requires no temperature compensation network.

Brief Description of the Drawings

The several features and advantages of the present invention will become more readily apparent from the following detailed description taken in conjunction with the accompanying drawings in which.

Description of the Preferred Embodiment

Referring to drawings, the sensor is indicated at 10 and has a substrate 11 formed of a thermoplastic resin. The preferred material for the substrate is Ryton R4 (40% glass, polyphenylene sulfide) manufactured by Phillips Chemical Co. Division of Phillips Petroleum. Other materials are polyethersulfone (VITREX PES by Imperial Chemical Industries), polyetheretherketone (VITREX PEEK) by Imperial Chemical Industries, polyetherimide (ULTEM 1000 by General Electric) and liquid crystal polymer (Vectra A150 by Celanese Advanced Technology Company). The substrate has a thick perimeter 12 having a series of stress-relieving cavities 13 spaced around its circumference. The perimeter is preferably about 0.150" thick.

The central portion consists of a thin diaphragm 15 that has a thickness in the range of 5 to 15 mils. The thickness of the diaphragm is governed by two major considerations. The thicker the diaphragm, the greater is the linearity of the output. The thinner the diaphragm, the greater is its sensitivity. A thickness of about 10 mils produces a sensitivity of 15 v/v/mmHg. The diaphragm is preferably about 0.500" in diameter. The diameter of the entire substrate is about 0.800".

Figure 1:
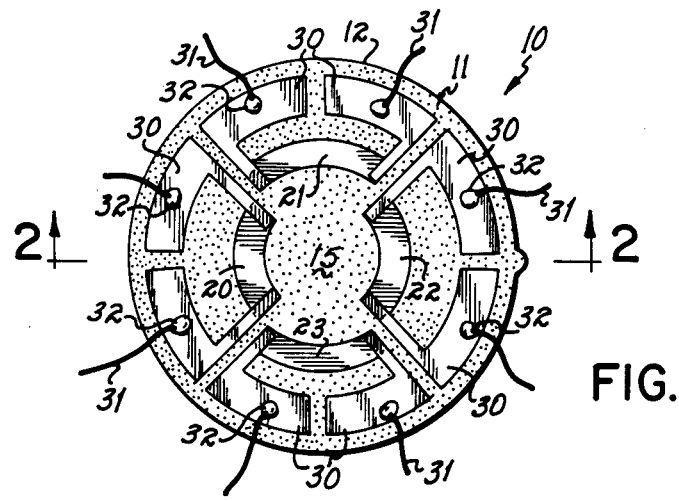
FIG. 1 is a plan view of a sensor of the present invention.
Figure 2:
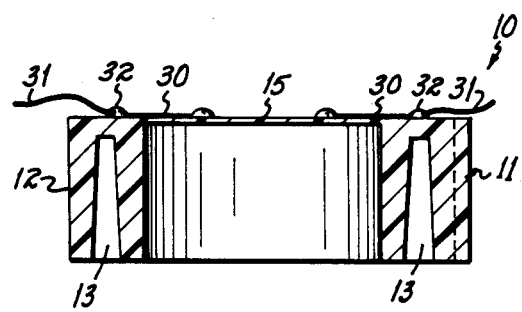
FIG. 2 is a cross-sectional view taken along lines 2—2 of FIG. 1.

Referring particularly to FIG. 1, conductive polymer resistors 20, 21, 22 and 23 are screen-printed on the diaphragm.

Printed conductor material such as paladium silver is applied as at 30 to the ends of each of the resistive elements 21–23. Leads 31 are connected to the printed conductor material by a conductive epoxy 32.

Figure 3:
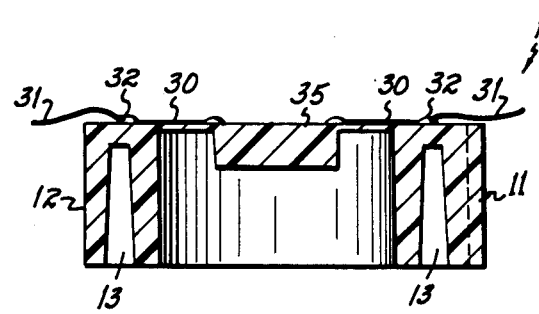
FIG. 3 is a cross-sectional view similar to that of FIG. 2 of an alternative embodiment.

In the alternative embodiment of FIG. 3, the element differs only from the element of the previous embodiment in the thick center portion 35. The center portion is preferably a thickness in the range of 0.080" to 0.090" and is ¼" in diameter. Sensors having rigid centers are known. The rigid centers are used for increasing the effective area and for generating high stresses in the diaphragm at lower deflection levels, thus improving the overall performance of the diaphragm.

Figure 4:
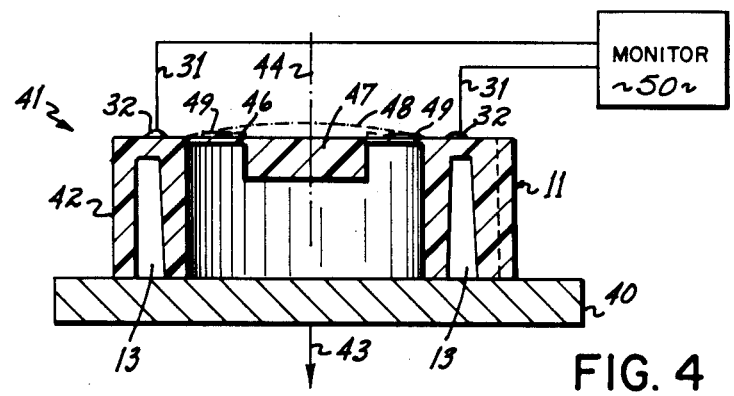
FIG. 4 is a diagrammatic cross section of the sensor as an accelerometer.
Figure 5:
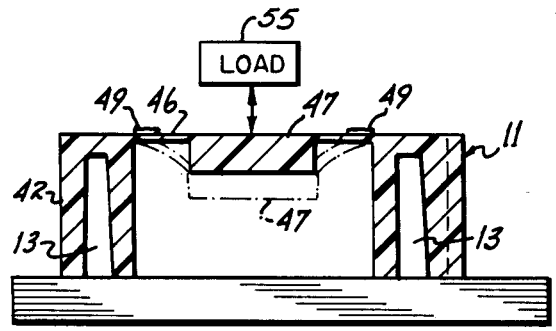
FIG. 5 is a diagrammatic cross section of the sensor as a load cell.

The sensor element of FIG. 3 can be used as an accelerometer as shown in FIG. 4 or as a load cell as shown in FIG. 5. Referring to FIG. 4, a movable body whose acceleration is to be measured is indicated at 40. A sensor 41, formed as described in FIG. 3, has its thick perimeter 42 fixed to the body 40. It is assumed that the acceleration of the body 40 will be in the direction of the arrow 43 and the axis of the sensor, indicated at 44, is aligned with the direction of acceleration of the body 40. It is to be understood, of course, that the axis 44 could be at an angle to the acceleration 43 and the system could be calibrated for the angle of difference between the direction of acceleration and the axis of the sensor. The perimeter 42 is integrally molded with a thin central section or diaphragm 46. Centered on it is an integrally molded boss 47 forming the major part of the mass that will move with respect to the perimeter upon acceleration of the body 40. When the body 40 accelerates in the direction of the arrow 43, the boss 47 will tend to lag behind the perimeter 42 causing the diaphragm 46 to flex as indicated by the phantom line 48.

Preferably, the sensor has the conductive polymer resistors 49 screen-printed on the diaphragm as depicted in FIG. 1. Two resistors could be used in place of the four, but that would reduce the sensitivity of the unit. Those resistors are connected into a Wheatstone bridge configuration and are connected to a monitor 50 to which the signal from the secondary transducer is transmitted.

The boss 47 and diaphragm 46 may be considered to be a primary transducer in that they convert the motion of the body 40 to a stress on the diaphgram 46. The resistor elements 49 screen-printed on the diaphragm are considered to be a secondary transducer that converts the stress on the diaphragm into a voltage proportional to the stress.

Referring to FIG. 5, the element 40 may be employed as a load cell. In this form of the invention, the size and configuration of the boss 47 is not so critical as in the embodiment of FIG. 4 apart from improvement of the overall performance of the diaphragm, as described in FIG. 3. However, it is useful as forming a location for the application of a load indicated at 55. When the load is applied to the boss 47, the diaphragm 46 is stressed and the secondary transducer, the resistors screen-printed on it, provide a signal proportional to the load applied.

Figure 6:
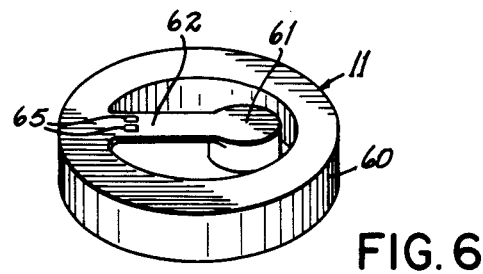
FIG. 6 is a diagrammatic perspective view of an alternative embodiment of the invention.

In the foregoing embodiments of FIGS. 4 and 5, the diaphragm 46 has been stretched across the thick perimeter 42. In the embodiment of FIG. 6, the thick perimeter is indicated at 60. A mass is indicated at 61, the mass being integral with a cantilevered beam 62 integrally molded at 63 to the thick perimeter 60. A pair of resistors, forming secondary transducers, is indicated at 65, these resistors being mounted on the beam 62 at a point adjacent the perimeter 60 where the greatest stress is likely to occur when a force is applied to the mass 61. The unit of FIG. 6 is especially adapted for use as an accelerometer.

Figure 7:
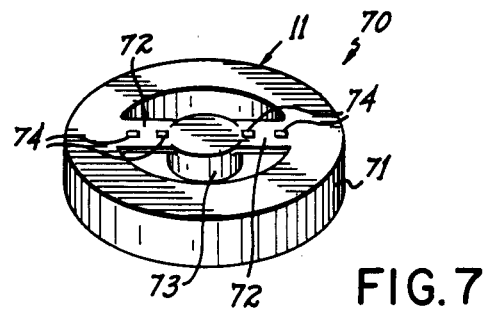
FIG. 7 is a diagrammatic perspective view of still another alternative embodiment of the invention.

A further embodiment is shown in FIG. 7. In that embodiment, a sensor indicated at 70 has the same thick perimeter 71 as has been described in connection with the preceding embodiments. Across the perimeter 71 and integrally molded therewith is a thin strap 72 carrying an integrally molded boss 73. Conductive polymer resistors 74 are printed on the thin portion of the strap 71 to be connected in the form of a Wheatstone bridge.

The embodiment of FIG. 7 can be employed as an accelerometer or a load cell.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. Apparatus comprising a body whose acceleration in a first direction is to be monitored,
    a primary transducer consisting of an integrally molded thermoplastic having a thick border, thin, flexible central diaphragm within said border and thick central boss forming a mass movable with respect to said border to flex said diaphragm,
    said mass being movable in said first direction when said body accelerates,
    a secondary transducer consisting of at least one conductive polymer resistor printed and baked on said diaphragm,
    and conductors connected to said secondary transducer.

2. A force sensor comprising:
    a molded high temperature, thermoplastic substrate having a thin, flexible section, a thick mass molded on said thin, flexible section, the thick mass and thin section forming a primary transducer,
    at least one conductive polymer resistor printed on said flexible section,
    said resistor changing its resistance when said substrate is flexed and forming a secondary transducer.

3. A force sensor comprising:
    a thick thermoplastic perimeter,
    a thin, flexible thermoplastic section molded integrally with and within said thick perimeter, a thick mass integrally molded on said thin section, the flexible section and the mass forming a primary transducer,
    at least one conductive polymer resistor printed and baked on said thin section between said mass and said perimeter, said resistor changing its resistance when said substrate is flexed and forming a secondary transducer.

4. A sensor as in claim 3 in which:
    said flexible section is in the form of a band fixed at one end to said perimeter and having said mass on the other end.

5. A sensor as in claim 3 in which:
    said perimeter is circular in cross section, and in which said flexible section is a strap extending across said perimeter and having said mass mounted in the center of said strap.

6. A force sensor as in claim 3 in which:
    said perimeter is circular in cross section and said thin, flexible section is a circular diaphragm extending across said perimeter, said mass being mounted at the center of said diaphragm.

* * * * *